United States Patent
Homon

(10) Patent No.: US 9,073,012 B2
(45) Date of Patent: Jul. 7, 2015

(54) IMMERSION-TYPE MEMBRANE SEPARATION APPARATUS

(75) Inventor: Yutaka Homon, Shima (JP)

(73) Assignee: SHIMAKANKYOUJIGYOU KYOUGYOUKUMIAI, Shima-shi (JP)

(*) Notice: Subject to any disclaimer, the term of this patent is extended or adjusted under 35 U.S.C. 154(b) by 1010 days.

(21) Appl. No.: 13/139,198

(22) PCT Filed: Oct. 5, 2009

(86) PCT No.: PCT/JP2009/005165
§ 371 (c)(1),
(2), (4) Date: Jun. 23, 2011

(87) PCT Pub. No.: WO2010/073442
PCT Pub. Date: Jul. 1, 2010

(65) Prior Publication Data
US 2011/0315619 A1   Dec. 29, 2011

(30) Foreign Application Priority Data
Dec. 25, 2008   (JP) .................. 2008-331156

(51) Int. Cl.
*B01D 65/02* (2006.01)
*B01D 63/04* (2006.01)
(Continued)

(52) U.S. Cl.
CPC .............. *B01D 61/18* (2013.01); *B01D 61/20* (2013.01); *B01D 63/043* (2013.01); *B01D 65/02* (2013.01);
(Continued)

(58) Field of Classification Search
CPC .. B01D 65/02; B01D 65/08; B01D 2321/185; B01D 2315/04; B01D 2315/06; B01D 61/18; B01D 61/20; B01D 29/70; B01D 29/725; B01D 29/86; B01D 29/856; B01D 2321/2075; B01D 2321/2058; B01D 63/043; C02F 1/36; C02F 3/1273; C02F 3/06

USPC .......... 210/636, 650, 748.01, 748.02, 748.03, 210/748.04, 748.05, 785, 321.6, 9, 332, 412
See application file for complete search history.

(56) References Cited

U.S. PATENT DOCUMENTS 5,014,564 A * 5/1991 Culkin ........................... 74/61
5,834,528 A   11/1998 Tanaka et al.
(Continued)

FOREIGN PATENT DOCUMENTS

| CN | 1333705 A | 1/2002 |
| DE | 10 2008 006 501 A1 | 9/2008 |

(Continued)

OTHER PUBLICATIONS

Japanese Office Action issued in Application No. 2008-331156; Dated Jun. 7, 2013 (With Partial English-language translation).
(Continued)

*Primary Examiner* — David C Mellon
*Assistant Examiner* — Pranav Patel
(74) *Attorney, Agent, or Firm* — Oliff PLC

(57) ABSTRACT

An immersion-type membrane separation apparatus having a novel structure, which enables a practically applicable level of cleaning of a separation membrane by means of an ultrasonic wave generated by an ultrasonic transducer and can exhibit steady filtration performance for a long period. An ultrasonic transducer for cleaning and removing matters adhering to a separation membrane during the filtration of raw water is provided. The matters adhering to the separation membrane is cleaned and removed by means of an ultrasonic wave emitted from the ultrasonic transducer. The separation membrane is made of polytetrafluoroethylene (PTFE).

8 Claims, 7 Drawing Sheets

(51) Int. Cl.
  *B01D 29/62* (2006.01)
  *C02F 3/06* (2006.01)
  *B01D 61/18* (2006.01)
  *B01D 61/20* (2006.01)
  *C02F 1/36* (2006.01)
  *C02F 1/44* (2006.01)

(52) U.S. Cl.
  CPC ..... *B01D 2315/06* (2013.01); *B01D 2321/2075* (2013.01); *C02F 1/36* (2013.01); *C02F 1/44* (2013.01); *B01D 2313/025* (2013.01)

(56) References Cited

U.S. PATENT DOCUMENTS

| | | | |
|---|---|---|---|
| 6,280,626 | B1 | 8/2001 | Miyashita et al. |
| 6,325,938 | B1 | 12/2001 | Miyashita et al. |
| 6,328,886 | B1 | 12/2001 | Miyashita et al. |
| 7,008,540 | B1 * | 3/2006 | Weavers et al. ............. 210/636 |
| 2004/0016699 | A1 * | 1/2004 | Bayevsky ............. 210/636 |
| 2007/0295674 | A1 * | 12/2007 | Kirker et al. ............. 210/785 |
| 2008/0156709 | A1 * | 7/2008 | Johnson ............. 210/106 |

FOREIGN PATENT DOCUMENTS

| | | |
|---|---|---|
| JP | A-03-213128 | 9/1991 |
| JP | U-06-060430 | 8/1994 |
| JP | A-07-256023 | 10/1995 |
| JP | A-07-292144 | 11/1995 |
| JP | A-07-299482 | 11/1995 |
| JP | A-08-257373 | 10/1996 |
| JP | A-09-103791 | 4/1997 |
| JP | A-09-276666 | 10/1997 |
| JP | A-9-299767 | 11/1997 |
| JP | A-10-052669 | 2/1998 |
| JP | A-10-314672 | 12/1998 |
| JP | A-11-319511 | 11/1999 |
| JP | A-11-319517 | 11/1999 |
| JP | A-2000-107574 | 4/2000 |
| JP | A-2001-17970 | 1/2001 |
| JP | A-2006-181434 | 7/2006 |
| JP | A-2007-111623 | 5/2007 |
| JP | A-2007-209949 | 8/2007 |
| JP | A-2008-073678 | 4/2008 |
| WO | WO 00/09245 A2 | 2/2000 |
| WO | WO2007001405 * | 1/2007 |
| WO | WO 2008/076082 A1 | 6/2008 |

OTHER PUBLICATIONS

International Search report issued in Application No. PCT/JP2009/005165; Dated Dec. 28, 2009.
Apr. 19, 2012 Extended European Search Report issued in European Patent Application No. 09834260.3.
International Preliminary Report on Patentability issued in Application No. PCT/JP2009/005165; Dated Aug. 9, 2011.
Chinese Office Action issued in Chinese Patent Application No. 200980152505.7 on Feb. 8, 2014 (with partial translation).

* cited by examiner

IMMERSION-TYPE MEMBRANE SEPARATION APPARATUS

TECHNICAL FIELD

This invention relates to an immersion-type membrane separation apparatus incorporating a separation membrane for use in raw water stored in a treatment tank while being kept immersed therein.

BACKGROUND ART

Septic tanks which employ a membrane separation system are known as equipment for purifying septic tank sludge, household wastewater sludge, night soil or the like.

As disclosed in Patent Document 1 (Japanese Unexamined Patent Publication No. JP-A-3-213128) or the like, such septic tanks in general have a structure in which raw water is filtered by a separation membrane immersed in the raw water stored in a treatment tank. Meanwhile, in such immersion-type membrane separation apparatus, as filtration continues on, impurities such as solids will adhere to the separation membrane, causing deterioration of filtration ability. Therefore, it is necessary to clean the separation membrane and remove the impurities adhering thereto.

Conventionally, as a method for cleaning the separation membrane, there have been proposed a method utilizing an ultrasonic wave as disclosed in Patent Document 1 or the like. Specifically, in this method, an ultrasonic wave cleaning apparatus exerts an ultrasonic oscillation on the surface of the filtration membrane so that oscillation of the membrane surface as well as interference between the oscillating membrane surface and the raw water will clean and remove matters adhering to the membrane surface such as the gel layer.

However, such ultrasonic wave cleaning apparatus have not yet been commercially available due to a significant problem for practical use. The problem is an issue of durability of the filtration membrane. That is, it has been found that if the ultrasonic oscillation is exerted directly on the surface of the filtration membrane, the separation membrane may be damaged early, resulting in problems of dispersing into the raw water in pieces.

Additionally, Patent Document 2 (Japanese Unexamined Patent Publication No. JP-A-11-319517) proposes a method of cleaning a separation membrane in which an ultrasonic transducer emits an ultrasonic wave so as to generate cavitation bubbles within the raw water, and an impact force created during disappearance of the cavitation bubbles is exerted on the separation membrane. However, in such a cleaning method, the entire membrane separation apparatus will be subjected to the impact force created during disappearance of the cavitation bubbles. This may pose a problem of durability of not only the separation membrane but also the membrane separation apparatus itself.

BACKGROUND ART DOCUMENTS

Patent Documents

Patent Document 1: JP-A-3-213128
Patent Document 2: JP-A-11-319517

SUMMARY OF THE INVENTION

Problem the Invention Attempts to Solve

The present invention has been developed in view of the above-described matters as the background, and it is an object of the present invention to provide an immersion-type membrane separation apparatus with a novel constitution which is able to clean a separation membrane utilizing an ultrasonic wave emitted by an ultrasonic transducer at practical levels, and thereby stably exhibiting filtration ability for a long period of time.

Means for Solving the Problem

Following are noted modes of the present invention made to resolve the problems described above. Note that the structural elements used in each mode noted below can be used freely in all possible combinations.

A principle feature of the present invention provides an immersion-type membrane separation apparatus including: a treatment tank storing raw water; a plurality of membrane modules placed within the treatment tank for filtering the raw water stored therein, each membrane module having a module main body and a separation membrane as a filter retained in a given form by the module main body; and an aerator provided below the membrane modules in the treatment tank, the immersion-type membrane separation apparatus being characterized in that: a PTFE separation membrane made of a polytetrafluoroethylene porous membrane is employed as the separation membrane of the membrane modules; and an ultrasonic transducer is provided for cleaning the PTFE separation membrane.

The immersion-type membrane separation apparatus of construction according to the present invention can be mainly characterized in that the PTFE separation membrane made of a specific material is employed in combination with the ultrasonic oscillation type membrane cleaning mechanism. With this arrangement, it is possible to clean the separation membrane with the ultrasonic wave while avoiding damage to the separation membrane. Thus, the present invention is able to provide an immersion-type membrane separation apparatus furnished with an ultrasonic wave cleaning function of a separation membrane at practical levels for the first time.

In the present invention, "retaining the separation membrane in a given form" refers to retaining the separation membrane in a state where the filtration ability can efficiently be exhibited. In specific terms, in the case where the separation membrane is a flat membrane, it is desirable to retain the separation membrane in a stretched state. In the case where the separation membrane is a hollow fiber membrane, it is desirable to retain a plurality of hollow fiber membranes in some relaxed state so that mutual adhesions can be reduced and each of the hollow fiber membranes can ensure a large area exposed to the raw water.

Whereas the PTFE separation membrane according to the present invention employs PTFE as a porous filter material, it is not limited to that made of PTFE only in its entirety. For example, for the purpose of reinforcement or the like, it would be also acceptable to employ a composite structure or a laminated structure integrated with other materials. More specifically, in the present invention, the PTFE separation membrane is preferably made by coating a base membrane made of polyethylene terephthalate with polytetrafluoroethylene.

Here, the base membrane which serves as the reinforcing material or the like is not limited in any particular way, provided that it is a porous material etc. having a diameter larger than that of the porous membrane made of PTFE and has an excellent water permeability. For example, while felt, non-woven fabrics, woven fabrics, mesh (a mesh-patterned sheet) or the like may be employed, it is desirable to employ non-woven fabrics from the perspective of strength, collection performance, flexibility or the like. As a fiber material for the reinforcing material, polyolefin (polyethylene, polypropylene or the like), polyamide, polyester (polyethylene terephthalate or the like), aromatic polyamide, or a composite material thereof or the like may be particularly well employed.

Besides, the method for producing the laminated body of the base membrane which serves as the reinforcing material or the like and the PTFE porous membrane may be, for example, simply juxtaposing them, or may be a method such as adhesive lamination with an adhesive material, thermal lamination or the like. Alternatively, it would also be possible to employ adhesive lamination by interposing a fusion material such as hot-melt powders.

Moreover, as disclosed in Japanese Unexamined Patent Publication No. JP-A-7-292144, it is also possible to laminate a plurality of PTFE porous membranes in order to constitute the PTFE porous membrane according to the present invention. Furthermore, as disclosed in Japanese Unexamined Patent Publication No. JP-A-7-256023, a reinforcing material made of metal may be laminated in addition to a reinforcing material made of synthetic resin.

As the ultrasonic transducer according to the present invention, while it is possible to employ any of various ultrasonic transducers known in the art, those utilizing piezoelectric phenomenon will be preferably employed from the perspective of ease of control or the like. For example, the ultrasonic transducers furnished with a piezoelectric element formed of a crystal such as a rock crystal, lithium niobate, or a piezoelectric ceramic such as barium titanate, lead zirconate titanate (PZT), or a piezoelectric polymer such as polyvinylidene fluoride (PVDF) will be preferably employed. In addition, in the present invention, the frequency of ultrasonic oscillation generated by the ultrasonic transducer is set appropriately depending on properties of the raw water or the like.

As the aerator according to the present invention, it is possible to employ any of those known in the art. Also, the type of gas supplied into the raw water by the aerator is suitably selected depending on properties of the raw water or the like. For example, in order to exhibit decomposition function by aerobic microorganisms, gas incorporating oxygen such as air will be selected. Meanwhile, in order to exhibit decomposition function by anaerobic microorganisms, nitrogen will be selected.

In accordance with another preferred mode of the present invention, the ultrasonic transducer is attached to the module main body so that an ultrasonic oscillation generated in the ultrasonic transducer is exerted on the PTFE separation membrane from the module main body. This mode makes it possible to transmit and exert the ultrasonic oscillation so as to disperse it over a wide area of the PTFE separation membrane, avoiding localized action of the high-energy ultrasonic oscillation on the PTFE separation membrane. Accordingly, the present invention is able to more effectively prevent damage to the PTFE separation membrane by the ultrasonic oscillation as well as to effectively exert cleaning action by the ultrasonic oscillation on the entire PTFE separation membrane.

In accordance with yet another preferred mode of the present invention, the ultrasonic transducer emits an ultrasonic wave so as to generate cavitation bubbles within the raw water, and an impact force created during disappearance of the cavitation bubbles is exerted on the PTFE separation membrane. In this mode, the entire PTFE separation membrane can be efficiently cleaned. Also, the impact force created during disappearance of the cavitation bubbles will induce stirring action. Accordingly, it is also possible to inhibit impurities such as solids from adhering to the PTFE separation membrane.

In accordance with yet another preferred mode of the present invention, the separation membrane has a thickness dimension of 0.1 to 0.3 mm. This will ensure sufficient adherence strength and durability of the separation membrane. Specifically, this is because if the thickness dimension of the separation membrane is smaller than 0.1 mm, it is difficult to impart sufficient durability to the separation membrane. On the other hand, if the thickness dimension of the separation membrane is larger than 0.3 mm, it is difficult to ensure adherence strength of the separation membrane to the module main body.

In accordance with yet another preferred mode of the present invention, the PTFE separation membrane is a flat membrane; the module main body has a flat-plate configuration; and the PTFE separation membrane is affixed to the module main body in a stretched state so as to cover at least one of a front surface side and a back surface side of the module main body. This mode is able to keep the shape of the separation membrane stable. As a result, the filtration ability by the separation membrane is readily kept stable. As conventionally known, in the membrane module, there is formed an inside area separated from the outside by the PTFE separation membrane. Thus, the purified water guided from the outside into the inside area through the PTFE separation membrane will be gathered within the inside area of the membrane module and taken out. At this point, in the case where the PTFE separation membrane is disposed to only one of the front and back surfaces of the membrane module in the plate thickness direction, the module main body serves as a closed wall of the other surface. Accordingly, the inside area can be defined between opposed faces of the closed wall and the PTFE separation membrane. On the other hand, in the case where the PTFE separation membrane is disposed to both front and back surfaces of the membrane module in the plate thickness direction, the inside area can be defined between the two PTFE separation membranes.

In accordance with yet another preferred mode of the present invention, the PTFE separation membrane is a hollow fiber membrane, and at least two ends of the hollow fiber membrane is supported by the module main body. In this mode, by employing the PTFE separation membrane having a hollow fiber membrane structure, it is possible to readily establish a large surface area of the separation membrane placed within the septic tank regardless of the inside shape or the like of the septic tank in comparison with the PTFE separation membrane having flat membrane contours.

Additionally, in the case where, as described previously, the module main body has a flat-plate configuration and the PTFE separation membrane having flat membrane contours is affixed to at least one of the front surface and the back surface of the module main body, the following mode is more preferably employed. Specifically, in accordance with yet another preferred mode of the present invention, a case frame that supports the plurality of membrane modules is fixed to an interior of the treatment tank; the plurality of membrane modules are arranged at given intervals in a thickness direction thereof by being supported by the case frame; the PTFE separation membrane of each membrane module is spread in a vertical direction; the module main body of each membrane module is provided with a pair of support pieces that project to widthwise opposite sides of the PTFE separation membrane and towards an outside; and the module main body is supported by the case frame at the pair of support pieces.

According to this mode, the membrane module is secured to the case frame at the location which will not be affected by the water current generated on the basis of aeration by the aerator. Therefore, although the support pieces project out from the membrane module, the water current will be inhibited from acting on the support pieces, thereby avoiding adverse effect on the support pieces such as increased vibration acted by the water current generated by the aeration. Moreover, the support pieces project to opposite sides away from the PTFE separation membrane. Thus, even if the support pieces become worn out due to vibration caused by the water current generated by the aeration or oscillation by ultrasonic oscillation, the wear will not directly cause damage or other adverse effect to the PTFE separation membrane. Accordingly, a stable support of the module main body is possible for a long period of time.

Besides, in the case where, as described in the above mode, the PTFE separation membrane having flat membrane contours is affixed to the membrane module and the plurality of the membrane modules are housed and supported within the case frame, it is desirable that the ultrasonic transducer is superposed against and attached to an outside surface of the case frame. With this arrangement, it is possible to dispose the ultrasonic transducer in proximity to the PTFE separation membrane.

Additionally in the same case where, as described in the above mode, the PTFE separation membrane having flat membrane contours is affixed to the membrane module and the plurality of the membrane modules are housed and supported within the case frame, the following mode is preferably employed in combination. Specifically, in accordance with yet another preferred mode of the present invention, the case frame is provided with a grasp mechanism for grasping each support piece by exerting grasping force on each of the pair of support pieces in the vertical direction, and a support position adjusting mechanism for adjusting a grasp position of the pair of support pieces by the grasp mechanism with respect to the case frame in the vertical direction.

Here, it is desirable that the grasp mechanism is provided to the upper end of the module main body, and is more preferably employed in combination with a lower end support mechanism of the module main body. As an example of the lower end support mechanism of the module main body, the following mode is preferably employed. Specifically, for example, in accordance with yet another preferred mode of the present invention, the case frame is provided at a base part thereof with a bottom surface support portion for supporting a lower end of the module main body in a state of contact from vertically below, thereby supporting the lower end of the module main body.

As an example of the grasp mechanism, the following mode is preferably employed. Specifically, in accordance with yet another preferred mode of the present invention, the grasp mechanism includes a pair of longitudinal connecting members extending in an arranging direction of the plurality of membrane modules while being superposed against the support pieces of the respective membrane modules from vertically opposite sides, and a fastening member for fastening the pair of the connecting members in a direction of getting closer to each other so as to grasp the support pieces of the respective membrane modules between the pair of the connecting members.

As the fastening member according to the present mode, it is preferable to employ a fastening structure or the like comprising a bolt and a nut, which fastens the pair of the connecting members in the opposing direction thereof so as to clasp the support piece of the membrane module. Also, by utilizing the bolt that constitutes the aforementioned fastening structure, or by using a separate bolt, there will be provided a nut fastening structure that connects and secures the connecting member and the case frame to each other while being capable of adjusting its securing position with respect to at least one of the connecting member and the case frame in the bolt axis direction. Accordingly, the support position adjusting mechanism described previously can be realized.

Furthermore, when employing the grasp mechanism in the present invention, it is desirable that an ultrasonic oscillation absorbing member is interposed at a site of grasp of the pair of support pieces by the grasp mechanism of the case frame. With this ultrasonic oscillation absorbing member, effect by the ultrasonic oscillation on the site of grasp of the each support piece by the grasp mechanism will be decreased. Thus, the wear or the like of the supported part can be reduced, thereby realizing a support structure of the membrane module with higher durability and reliability. Note that in the case where the bottom surface support portion (described previously) is employed, the lowermost portion of the module main body may be positioned in abutment with the bottom surface support portion via the ultrasonic oscillation absorbing member.

EMBODIMENTS FOR CARRYING OUT THE INVENTION

Figure 1:
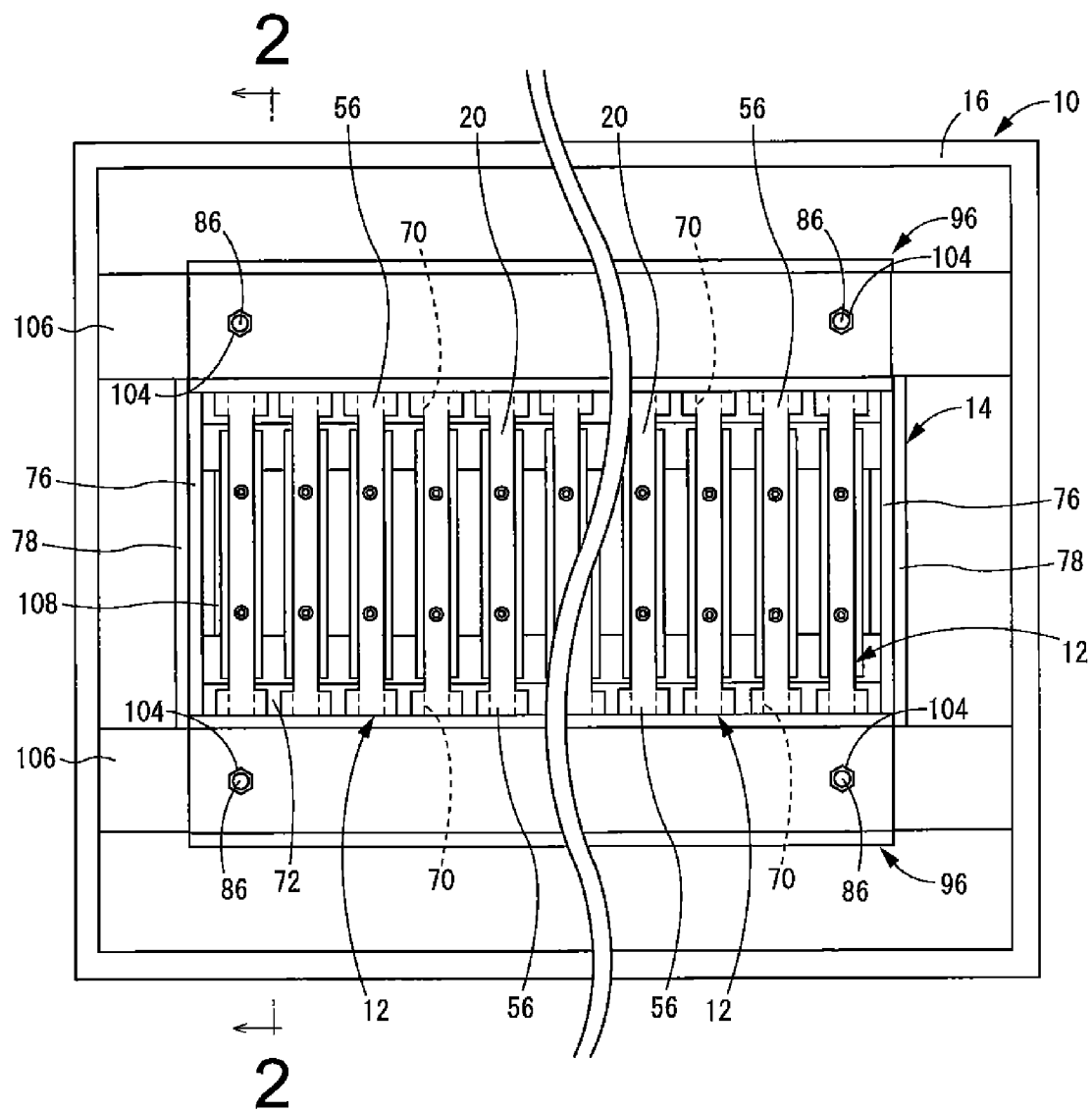
FIG. 1 is a top plane view of an immersion-type membrane separation apparatus according to a first embodiment of the present invention.

Following, to further clarify the present invention more specifically, embodiments of the present invention are described in detail while referring to the drawings.

Figure 2:
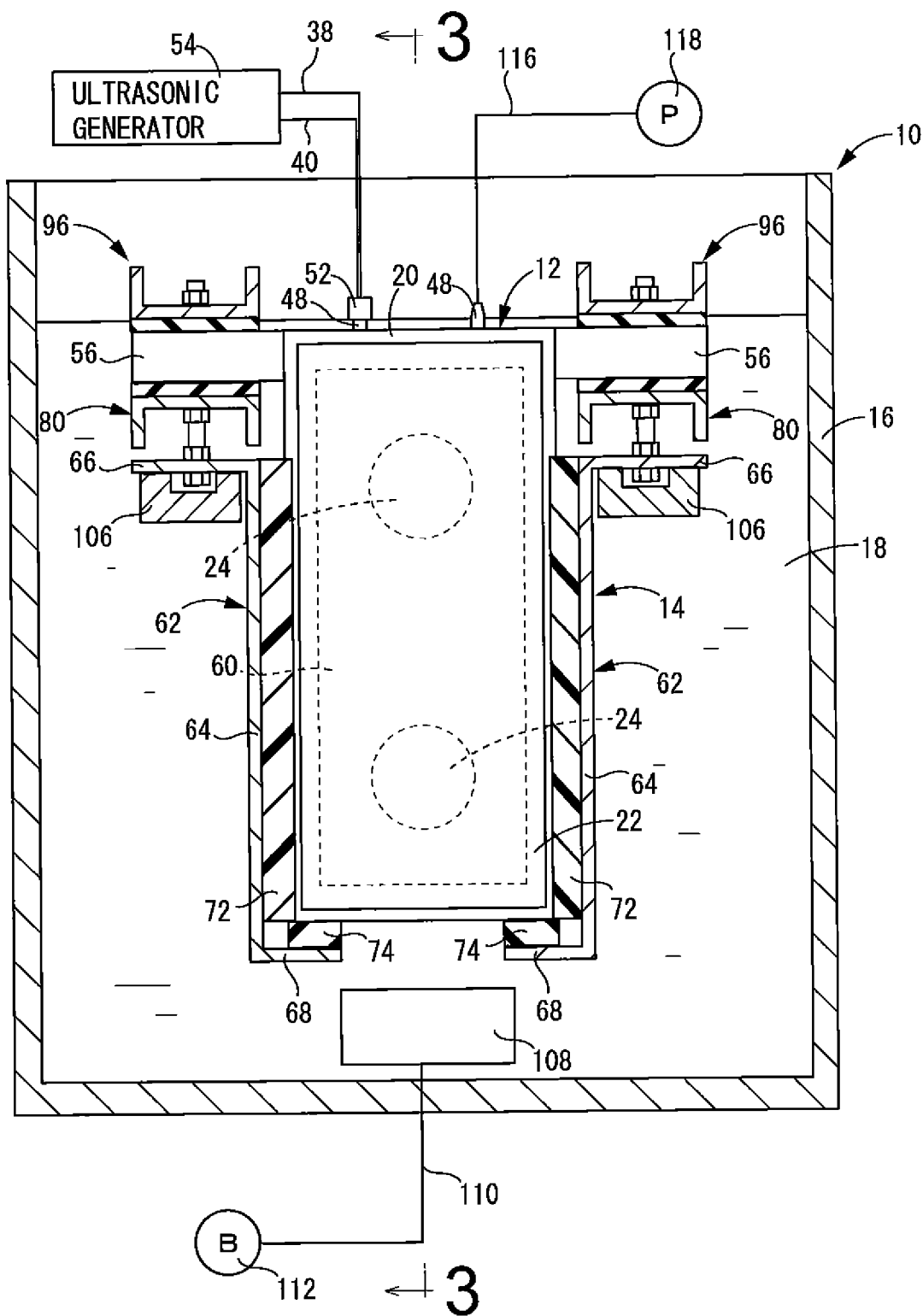
FIG. 2 is a cross sectional view taken along line 2-2 of FIG. 1.

FIGS. 1 and 2 depict an immersion-type membrane separation apparatus 10 according to a first embodiment of the present invention. The immersion-type membrane separation apparatus 10 has a structure in which a plurality of membrane modules 12 are housed within a case frame 14. The apparatus 10 is used with the membrane modules 12 kept immersed in a water 18 to be treated serving as raw water stored in a treatment tank 16. In the description hereinbelow, as a general rule the vertical direction refers to the vertical direction in FIG. 2, which is also the direction in which the membrane modules 12 are inserted into the case frame 14.

Figure 3:
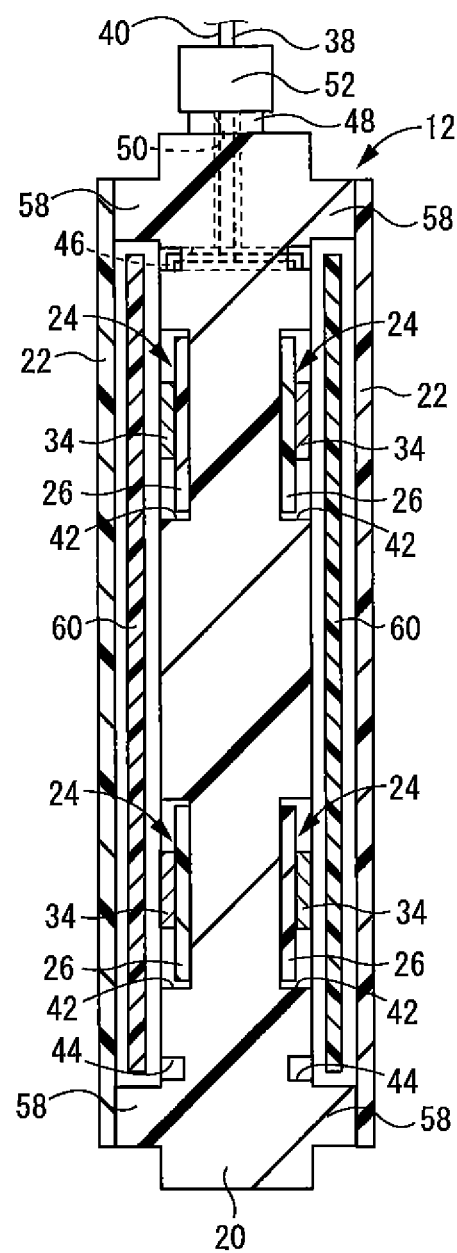
FIG. 3 is a longitudinal cross sectional view of a membrane module employed in the immersion-type membrane separation apparatus, taken along line 3-3 of FIG. 2.

Described more specifically, as depicted in FIG. 3, each of the plurality of membrane modules 12 has a structure in which a separation membrane 22 serving as a PTFE separation membrane is affixed to a module main body 20. The module main body 20 is formed of a rigid synthetic resin material such as ABS, and has a rectangular flat plate shape overall.

In the present embodiment, the module main body 20 is provided with an ultrasonic transducer 24. The ultrasonic transducer 24 is a plate-shaped ultrasonic transducer 24 which is known in the art such as Japanese Unexamined Patent Publication No. JP-A-10-314672. Simply described, in the ultrasonic transducer 24 according to the present embodiment, a substrate-side electrode (not shown) is formed on one side of a substrate 26, and a piezoelectric element 34 is secured to the substrate-side electrode with a sealing material (not shown). The piezoelectric element 34 has drive electrodes (not shown) formed on its front and back surfaces. By applying a high-frequency alternating voltage between the two drive electrodes of the piezoelectric element 34, an ultrasonic oscillation will generate. The frequency of the ultrasonic oscillation depends on the thickness dimension of the piezoelectric element 34 or the like. Thus, the thickness dimension of the piezoelectric element 34 or the like is set so as to obtain a desired vibration frequency. In this respect, while the frequency of the ultrasonic oscillation is not limited in particular, it is desirably set to 20 kHz-50 kHz. Besides, the alternating voltage is applied between the two drive electrodes of the piezoelectric element 34 through lead wires 38, 40; the lead wire 38 is attached to the drive electrode which is not electrically connected to the substrate-side electrode, and the lead wire 40 is attached to the substrate-side electrode.

The ultrasonic transducer 24 is housed within a housing recess 42 formed in the module main body 20 and secured to the module main body 20 with the substrate 26 fixed to the module main body 20 by bonding, ultrasonic welding or the like. Accordingly, the oscillation force will be directly transmitted to the module main body 20. The position of the housing recess 42 depends on sizes of the separation membrane 22 and the anchoring face of the separation membrane 22, required cleaning ability or the like. Note that in the present embodiment, a plurality of housing recesses 42 are formed on each of the front and back surfaces of the module main body 20, and are positioned at the widthwise center and the lengthwise middle section of the module main body 20, being spaced apart from one another by an appropriate distance. Specifically, in the present embodiment, two ultrasonic transducers 24 are provided to each of the front and back surfaces of the module main body 20.

An inducing groove 44 is formed on each of the front and back surfaces of the module main body 20. The inducing groove 44 on the front surface and the inducing groove 44 on the back surface are connected to each other via a communication hole 46 that pierces the upper end portion of the module main body 20 in the thickness direction. In the present embodiment, two such communication holes 46 are formed.

On the upper end face of the module main body 20, there are provided nozzles 48 projecting upward. The nozzle 48 has a nozzle hole 50 which opens onto the wall face of the communication hole 46. Namely, the nozzle hole 50 is connected to the communication hole 46 from lateral side.

In this respect, the pair of lead wires 38, 40, which are connected to the ultrasonic transducer 24 secured to the module main body 20 as described above, are disposed within the inducing grooves 44. The lead wires 38, 40 lead to the outside of the module main body 20 from the nozzle hole 50 of one of the nozzles 48. In the present embodiment, one of the nozzles 48 is covered with a rubber cap 52 having a hole, and the lead wires 38, 40 lead to outside from the hole. With this arrangement, the water 18 filtered by the separation membrane 22 is prevented from flowing out of the nozzle hole 50 which the lead wires are passed through.

The pair of the lead wires 38, 40 leading to outside are connected to an ultrasonic generator 54. The ultrasonic generator 54 is adapted to apply voltage between the drive electrodes of the ultrasonic transducer 24. As the ultrasonic generator 54, it is possible to employ any of those known in the art.

Furthermore, on the upper end face of the module main body 20, there are provided a pair of support pieces 56, 56 projecting outward in the width direction from its opposite side faces. In the present embodiment, the thickness dimension of each of the support pieces 56, 56 (the dimension along the direction perpendicular to the paper surface in FIG. 2) is made larger than the dimension of the module main body 20 in the plate thickness direction.

On each of the front and back surfaces of the module main body 20, there is provided a welded projection 58 that extends along the entire circumference of the module main body 20 in proximity to its outside peripheral edge. The welded projection 58 has contours that correspond to the outer peripheral configuration of the separation membrane 22.

Meanwhile, the separation membrane 22 is made of polytetrafluoroethylene (PTFE), and has a sheet shape overall. In particular, in the present embodiment, the separation membrane 22 has a structure in which a PTFE porous membrane is laminated to a reinforcing material. Incidentally, the separation membrane 22 according to the present embodiment has a structure in which a PET nonwoven fabrics serving as a reinforcing material is coated with a PTFE porous membrane by thermal welding.

At this point, in the present embodiment, the separation membrane 22 has a thickness dimension of 0.1 to 0.3 mm. Specifically, this is because if the thickness dimension of the separation membrane 22 is smaller than 0.1 mm, it is difficult to ensure durability of the separation membrane 22. On the other hand, if the thickness dimension of the separation membrane 22 is larger than 0.3 mm, it is difficult to advantageously ensure adherence strength of the separation membrane 22 to the module main body 20.

Such separation membrane 22 is superposed against and affixed to each of the front and back surfaces of the module main body 20 in a stretched state. Specifically, the outer peripheral edge of the separation membrane 22 is ultrasonic welded to the welded projection 58.

A spacer 60 is housed between opposed faces of the module main body 20 and the separation membrane 22 affixed to each other as described above. The spacer 60 is formed of an appropriate synthetic resin material having corrosion resistance to raw water such as polyethylene terephthalate (PET), and has a thin-plate shape. The effective surface area of the separation membrane 22 is defined by the spacer 60.

Specifically, the spacer 60 is a porous material, which prevents the separation membrane 22 from becoming water-impermeable due to its adhesion to the module main body 20. Also, the spacer 60 supports the back face of the separation membrane 22 so as to ensure durability of the separation membrane 22 while undergoing pressure. Here, the separation membrane 22 has the effective surface area of, for example, 0.8 to 1.3 square meters including both front and back surfaces thereof. The arrangement of the spacer 60 between opposed faces of the module main body 20 and the separation membrane 22 can be realized by superposing spacer 60 on the module main body 20, and after securing the spacer 60 to the module main body 20 if needed, by superposing and affixing the separation membrane 22 to the module main body 20 so as to cover the spacer 60.

Meanwhile, the case frame 14 is furnished with a pair of sidewall constituent components 62, 62. The pair of sidewall constituent components 62, 62 are each formed of high rigidity material having corrosion resistance such as stainless steel, and furnished with sidewalls 64 of rectangular flat plate shape. Note that the way of imparting corrosion resistance to the sidewall constituent component 62 may either be forming the sidewall constituent component 62 of materials having corrosion resistance, or be plating the component 62 with such material.

On the upper end of the sidewall 64, there is provided an upper extended plate 66 that extends to one side in the thickness direction across the entire length thereof. On the lower end of the sidewall 64, there is provided a lower extended plate 68 serving as a bottom surface support portion that extends to the other side in the thickness direction across the entire length thereof. Moreover, the sidewall 64 has, on the other side in the thickness direction, a slit member 72 including a plurality of slits 70 that are arranged at appropriate intervals. Furthermore, on the upper face of the lower extended plate 68, there is provided a contact rubber 74 across the entire length thereof.

The pair of sidewall constituent components 62, 62 constructed as above are arranged in opposition to each other with the respective slit members 72 facing each other. In this state, each of the plurality of slits 70 formed on the respective slit members 72 are opposed to each other in the opposing direction of the pair of sidewall constituent components 62, 62. Additionally, the pair of sidewall constituent components 62, 62 arranged in opposition to each other as described above are connected to each other at their lengthwise opposite ends by a connecting member 76. The connecting member 76 is formed of a high rigidity material having corrosion resistance such as stainless steel. Note that as the way of securing the connecting member 76 and the each sidewall constituent component 62, it is possible to employ any of various securing ways known in the art such as welding, securing with bolts, securing with a caulking pin, or the like.

A vertical plate 78 bridges across the lengthwise opposite ends of the pair of the sidewall constituent components 62, 62. The vertical plate 78 is formed of synthetic resin material such as vinyl chloride. This arrangement defines the case frame 14 which opens to both the upper and lower sides overall. Note that as the way of securing the vertical plate 78 and the each sidewall constituent component 62, it is possible to employ any of various securing ways known in the art such as securing with bolts, securing with a caulking pin, or the like.

The case frame 14 constructed as above houses and supports the plurality of membrane modules 12. In particular, in the present embodiment, the widthwise opposite ends of the each membrane module 12 are placed within the pair of slits 70, 70, which are opposed to each other in the width direction. Accordingly, the plurality of membrane modules 12 are arranged at given intervals in the plate thickness direction. In this state, the separation membrane 22 of the each membrane module 12 is spread in the vertical direction.

Figure 4:
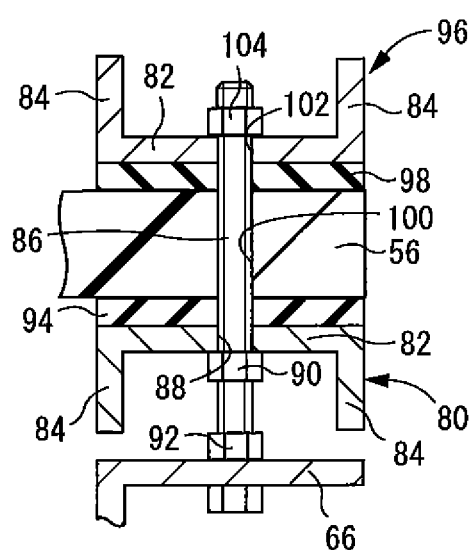
FIG. 4 is an enlarged longitudinal cross sectional view of a support structure of a support piece.

As depicted in FIG. 4, the pair of support pieces 56, 56, of the each membrane module 12 are placed on a first plate-shape connecting member 80 provided above the upper extended plate 66. The first plate-shape connecting member 80 is formed of a high rigidity material such as stainless steel, and is furnished with a flat plate portion 82. The flat plate portion 82 has the lengthwise dimension sufficiently larger than its width dimension. In addition, at the widthwise both ends of the flat plate portion 82, there are provided reinforcing ribs 84, 84 that extend across the entire length thereof. With this arrangement, the first plate-shape connecting member 80 overall has a shape of a recessed groove.

The first plate-shape connecting member 80 constructed as above is arranged above the upper extended plate 66 with the reinforcing ribs 84, 84 projecting toward the upper extended plate 66. Specifically, bolts 86 projecting at the lengthwise opposite ends of the upper extended plate 66 are inserted into insertion holes 88 formed at the lengthwise opposite ends of the first plate-shape connecting member 80. With that state, the first plate-shape connecting member 80 is placed on positioning nuts 90 threadably mated with the bolts 86, whereby the first plate-shape connecting member 80 is arranged above the upper extended plate 66. Note that the bolts 86 are secured to the upper extended plate 66 with securing nuts 92 threadably mated therewith.

In the present embodiment, the membrane modules 12 are housed within and supported by the case frame 14 with the support pieces 56 placed on the first plate-shape connecting member 80 via a clamped rubber element 94 serving as an ultrasonic oscillation absorbing member. In this state, the each membrane module 12 is positioned in abutment with the contact rubber 74.

Meanwhile, in the present embodiment, a second plate-shape connecting member 96 is superposed against the support pieces 56 of the each membrane module 12 via a clamped rubber element 98 serving as an ultrasonic oscillation absorbing member. In the present embodiment, the second plate-shape connecting member 96 is constituted by components that are identical with those of the first plate-shape connecting member 80, and a detailed description will not be provided here.

At this point, in the present embodiment, the first plate-shape connecting member 80 and the second plate-shape connecting member 96 are connected and secured to each other in the vertical direction, which is also the opposing direction thereof. Whereas in the present embodiment, the first and second plate-shape connecting members 80, 96 are connected to each other by the respective bolts 86 at only the lengthwise opposite ends thereof, no particular limitation is imposed as to the connecting structure. It would also be possible to connect the first and second plate-shape connecting members 80, 96 at three or more locations along their lengthwise direction by bolts or the like.

In specific terms, the bolt 86 is inserted into the insertion holes 100, 102 formed in the support piece 56 and the second plate-shape connecting member 96, respectively. A fastening nut 104 is threadably mated with the distal end portion of the bolt 86 projecting out of the second plate-shape connecting member 96 (the portion which projects upward from the second plate-shape connecting member 96). The fastening nut 104 and the positioning nut 90 clamp and retain the support pieces 56, thereby securing the membrane modules 12 positioned at opposite ends in the arranging direction. That is, in the present embodiment, a fastening member and hence a grasp mechanism is provided including the bolts 86, the fastening nut 104, and the positioning nut 90. Note that the support pieces 56 are clamped and retained between the first plate-shape connecting member 80 and the second plate-shape connecting member 96 via the clamped rubber elements 94, 98.

With this arrangement, all the membrane modules 12 are clamped and retained between the first plate-shape connecting member 80 and the second plate-shape connecting member 96 at their support pieces 56 formed projecting from their opposite sides, by utilizing clamping force of the fastening nut 104 and the positioning nut 90.

The case frame 14 which houses and supports the plurality of membrane modules 12 as described above is arranged within the treatment tank 16. In the present embodiment, the upper extended plate 66 is placed on a pair of suspension support members 106, 106 that bridge across the treatment tank 16. Accordingly, case frame 14 is arranged within the treatment tank 16 by being suspended therefrom. In this state, the entire separation membrane 22 of the each membrane module 12 is immersed in the water 18 to be treated.

With the case frame 14 arranged within the treatment tank 16 as described above, an aerator 108 is located on the base part of the treatment tank 16 and positioned below the membrane module 12. The aerator 108 is connected to a blower 112 located outside of the treatment tank 16 through an air conduit 110.

Additionally, with the case frame 14 arranged within the treatment tank 16 as described above, the other nozzle 48 of the each membrane module 12 is connected to a water pipe 116. Further, the water pipe 116 is connected to a suction pump 118. In the present embodiment, ON/OFF operation of the suction pump 118 depends on the amount of the stored water 18 to be treated. This operation control of the suction pump 118 is realized by utilizing a signal from a sensor for detecting the liquid surface level of the water 18 to be treated.

Hereinbelow, operation of the immersion-type membrane separation apparatus 10 constructed as above will be described. Initially, wastewater is supplied from a wastewater supply pipe (not shown) arranged above the treatment tank 16. The wastewater is mixed with activated sludge within the treatment tank 16 and becomes the water 18 to be treated. Subsequently, the water 18 is aerated by air supplied from the aerator 108 while being purified by the activated sludge. Then, the water 18 is sucked by the suction pump 118. Accordingly, the water 18 is filtered by the separation membrane 22. The filtered water 18 will be discharged to the outside through the water pipe 116.

During filtration by the separation membrane 22, or when the filtration is paused, a high-frequency alternating voltage is applied from the ultrasonic generator 54 to the ultrasonic transducer 24. By so doing, the ultrasonic transducer 24 generates ultrasonic oscillation and the ultrasonic oscillation is transmitted from the module main body 20 to the separation membrane 22. As a result, the separation membrane 22 oscillates and the impurities adhering to the separation membrane 22 will be cleaned and removed. The cleaning of the separation membrane 22 may be carried intermittently at certain intervals, or for a prescribed time period, or continuously all the time.

In this respect, since the immersion-type membrane separation apparatus 10 as described above employs the separation membrane 22 made of PTFE, it is possible to avoid troubles such as being damaged by the ultrasonic oscillation transmitted to the separation membrane 22. Thus, the separation membrane 22 can effectively be cleaned.

Also, in the present embodiment, the each membrane module 12 is fixed by the case frame 14 above the upper extended plate 66. This means that the fixing portion of the each membrane module 12 to the case frame 14 is positioned away from the water current generated on the basis of the aeration by the aerator 108. This will avoid adverse effect on the fixing portion such as play of the fixing portion affected by the water current generated by the aeration.

Moreover, in the present embodiment, the membrane module 12 is supported by the clamping force of the fastening nut 104 and the positioning nut 90 acted on the support pieces 56. Thus, even if the support piece 56 etc. becomes worn out and the fastening nut 104 or the positioning nut 90 becomes loosened due to ultrasonic oscillation or vibration caused by the water current, it is possible to securely fix the membrane module 12 again by re-fastening the fastening nut 104.

In the present embodiment in particular, since the fastening nut 104 is threaded onto the distal end portion of the bolt 86, re-fastening of the fastening nut 104 can be easily operated.

Furthermore, in the present embodiment, according to the position of the positioning nut 90 threadably mated, it is possible to adjust the vertical position where the membrane module 12 is to be supported. Therefore, when the support piece 56 etc. becomes worn out and the fastening nut 104 is re-fastened, the vertical position where the membrane module 12 is to be supported can be adjusted to the intended position by adjusting the position of the positioning nut 90. That is, in the present embodiment, the bolt 86 and the positioning nut 90 constitute a support position adjusting mechanism.

Additionally, in the present embodiment, the support piece 56 is clamped by the pair of the clamped rubber elements 94, 98. Thus, the ultrasonic oscillation generated by the ultrasonic transducer 24 or the vibration caused by the water current on the basis of the aeration is less likely to be transmitted to the support piece 56. As a result, it is possible to inhibit the support piece 56 from being worn out due to such oscillation or vibration.

Besides, in the present embodiment, among the plurality of membrane modules 12, only the two membrane modules 12 situated at the opposite ends in the arranging direction are fixed by the bolt 86 and the positioning nut 90. The other membrane modules 12 are fixed by being clamped and retained by the first plate-shape connecting member 80 and the second plate-shape connecting member 96. Accordingly, the plurality of membrane modules 12 are easily fixed to the case frame 14.

Figure 5:
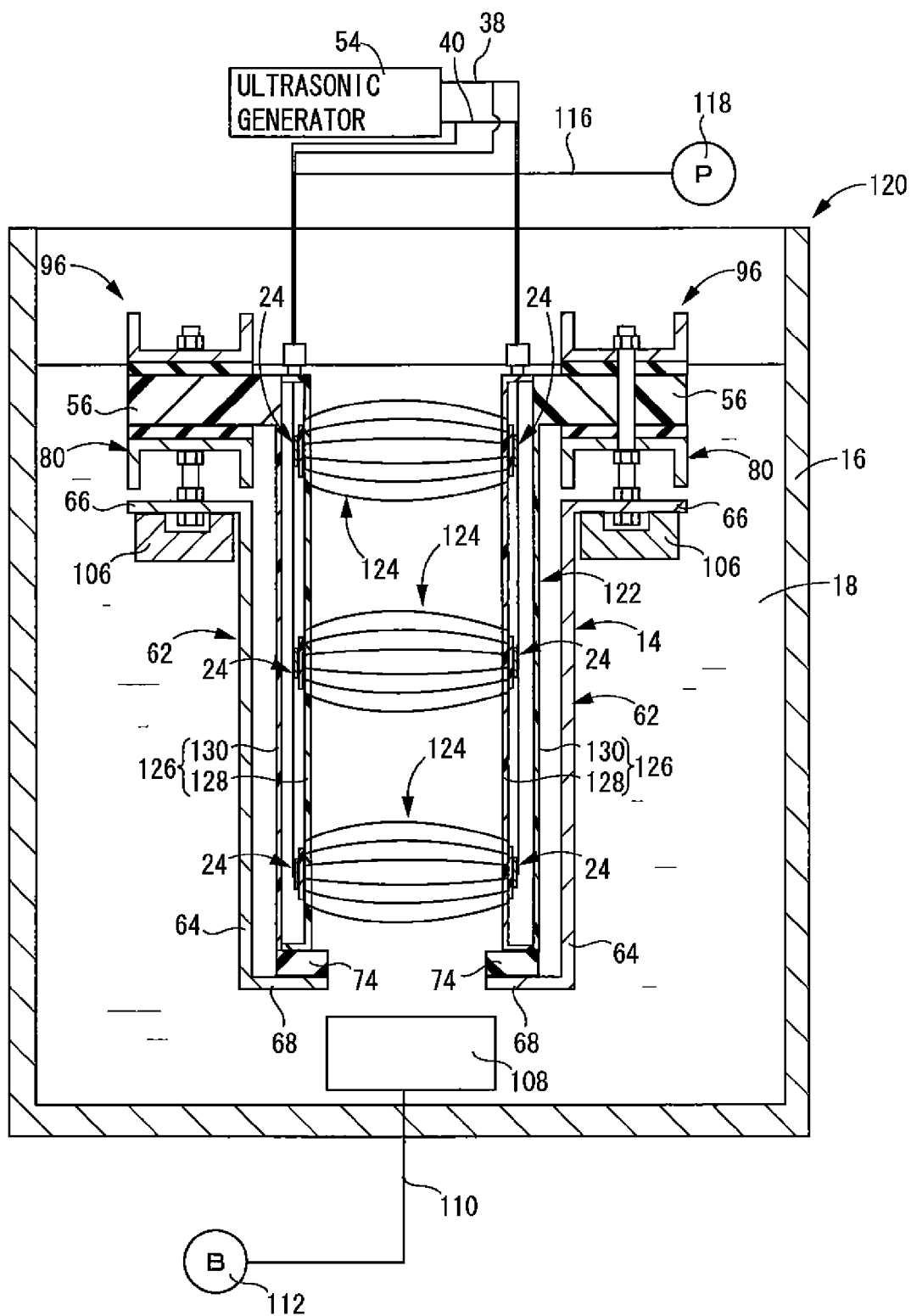
FIG. 5 is a longitudinal cross sectional view of an immersion-type membrane separation apparatus according to a second embodiment of the present invention.

The description now turns to an immersion-type membrane separation apparatus 120 according to a second embodiment of the present invention, making reference to FIG. 5. Components and parts appearing in the second embodiment below and in the third embodiment described subsequently and comparable in construction to those in the first embodiment have been assigned the same drawing symbols as in the first embodiment and are not discussed in detail.

The immersion-type membrane separation apparatus 120 according to the present embodiment differs from the immersion-type membrane separation apparatus (10) as to a membrane module 122. The membrane module 122 of the present embodiment is furnished with a multitude of separation membranes 124 formed of a hollow fiber membrane. The multitude of separation membranes 124 are supported at their opposite ends by a water collecting basin 126 serving as a module main body.

Described more specifically, the separation membrane 124 is made of PTFE. The separation membrane 124 has a thickness dimension (the differential between the dimension from its center to its outside peripheral face and the dimension from its center to its inside peripheral face) of 0.1 to 0.3 mm. This will ensure durability of the separation membrane 124 as well as adherence strength of the separation membrane 124 to the water collecting basin 126.

Meanwhile, the water collecting basin 126 is formed of a synthetic resin material such as ABS, and has a rectangular box shape overall. In the present embodiment, the water collecting basin 126 of hollow structure is defined by a main body 128 and a lid 130 welded to the main body 128. While not shown explicitly in the drawings, the water collecting basin 126 has two nozzles 48 projecting upward. In addition, on the upper end of the water collecting basin 126, there are provided the support pieces 56 projecting outward in the thickness direction of the water collecting basin 126. Besides, the ultrasonic transducer 24 is provided to the water collecting basin 126. The fixing of the ultrasonic transducer 24 to the water collecting basin 126 can be realized by ultrasonic welding of the substrate 26 to the water collecting basin 126 or the like. The lead wires 38, 40 of the ultrasonic transducer 24 lead to the outside from the nozzle hole 50 provided to one of the nozzles 48.

To the water collecting basin 126 constructed as above, the ends of the separation membrane 124 are secured. Specifically, the ends of the separation membrane 124 are inserted into support holes formed in the water collecting basin 126 and ultrasonic welded to the water collecting basin 126. In the present embodiment in particular, the separation membranes 124 are secured to the locations that surround the ultrasonic transducer 24.

The membrane module 122 constructed as above is fixed to the case frame 14 by utilizing the support pieces 56 provided to the water collecting basin 126. In this state, the separation distance between the pair of the water collecting basins 126, 126 that support the opposite ends of the separation membrane 124 is set so that the separation membranes 124 are in a relaxed state. However, even in the relaxed state, the separation membranes 124 are not in contact with one another.

In the immersion-type membrane separation apparatus 120 constructed as above, an effect comparable to that in the first embodiment may be attained, because the separation membrane 124 is made of PTFE.

Figure 6:
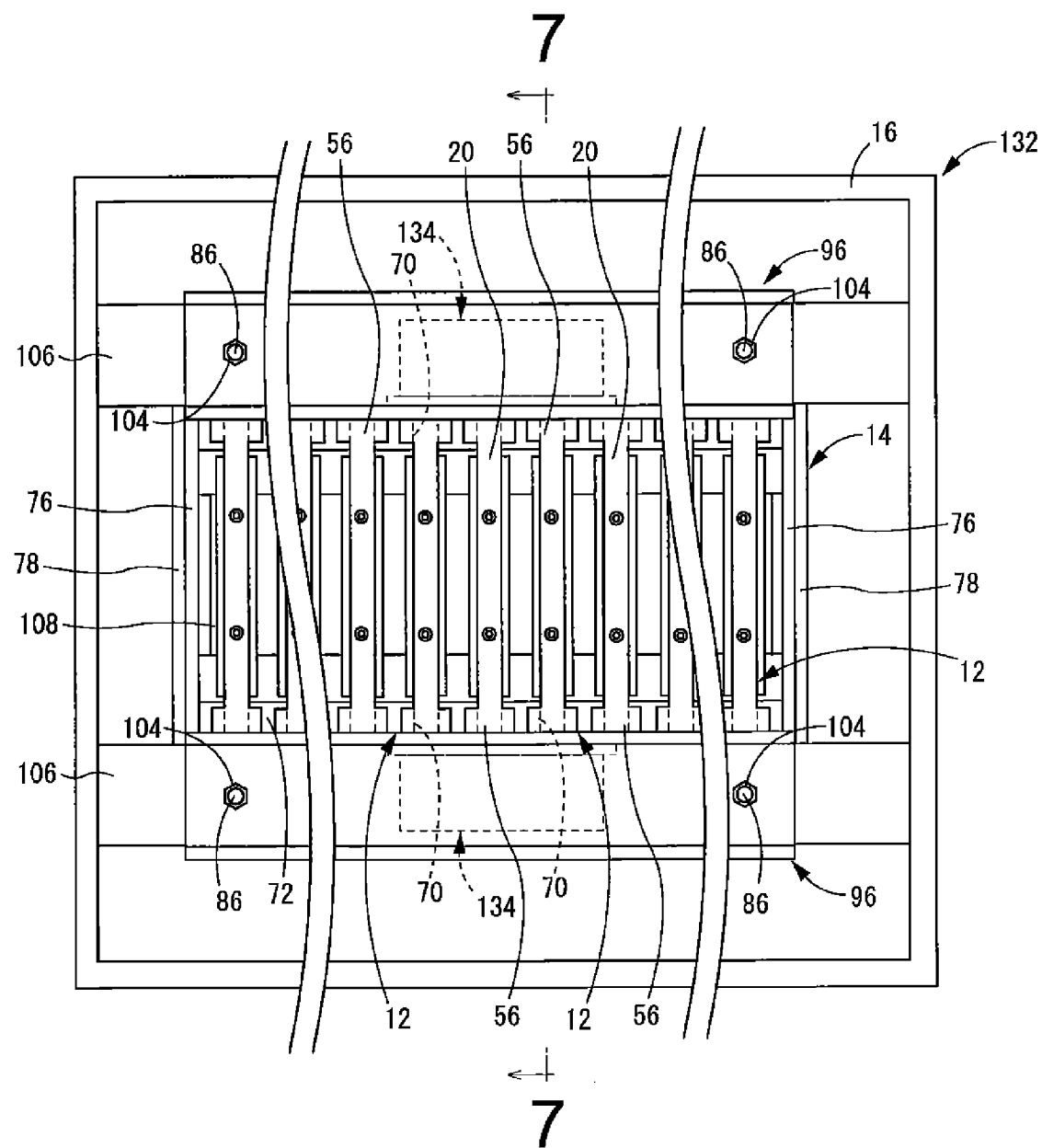
FIG. 6 is a top plane view of an immersion-type membrane separation apparatus according to a third embodiment of the present invention.
Figure 7:
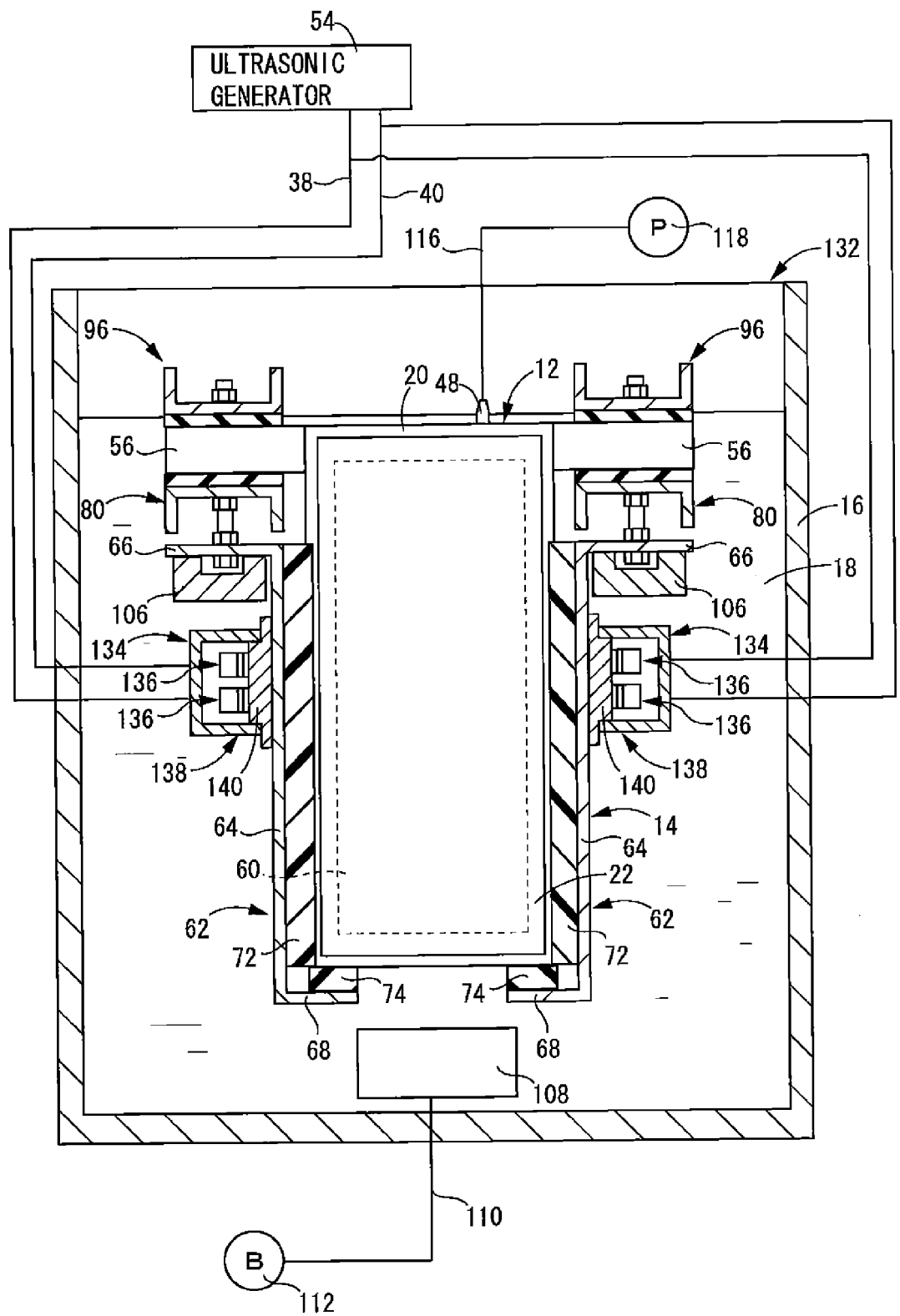
FIG. 7 is a cross sectional view taken along line 7-7 of FIG. 6.

The description now turns to an immersion-type membrane separation apparatus 132 according to a third embodiment of the present invention, making reference to FIGS. 6 and 7. The immersion-type membrane separation apparatus 132 according to the present embodiment differs from the immersion-type membrane separation apparatus (10) as to a mounting location of an ultrasonic transducer 136 (an ultrasonic oscillation unit 134).

That is, in the present embodiment, the ultrasonic transducer (24) is not mounted onto the module main body 20. Instead, the ultrasonic oscillation unit 134 is mounted onto the case frame 14. In specific terms, the ultrasonic oscillation unit 134 is superposed against and mounted onto the outside surface (one of the surfaces in the thickness direction) of the sidewall 64 of the each sidewall constituent component 62 that constitutes the case frame 14.

At this point, the ultrasonic oscillation unit 134 according to the present embodiment is an ultrasonic oscillation unit which is known in the art such as Japanese Unexamined Patent Publication No. JP-A-10-52669. Simply described, the ultrasonic oscillation unit 134 has a structure in which the ultrasonic transducer 136 having an ultrasonic wave cleaning surface is housed within a hermetic case 138. The ultrasonic transducer 136 is constituted by a bolted Langevin-type transducer which is known in the art. In the present embodiment in particular, a part of the wall of the hermetic case 138 defines a front mass member 140 of the bolted Langevin-type transducer. Additionally, in the present embodiment, a plurality of the ultrasonic transducers 136 are arranged in a matrix.

The ultrasonic oscillation unit 134 constructed as above is secured to the sidewall 64 of the sidewall constituent component 62 at a mounting flange provided to the hermetic case 138. In specific terms, for example, a mounting bolt that projects from the sidewall 64 is inserted into a bolt insertion hole formed in the mounting flange, and a mounting nut is threadably mated with the mounting bolt, whereby the hermetic case 138 is secured to the sidewall 64.

In this regard, it is desirable that the mounting location of the ultrasonic oscillation unit 134 to the sidewall 64 is, in the depth direction of the case frame 14, generally the center in the height direction of the membrane module 12 housed in the case frame 14. This makes it possible to evenly clean the entire separation membrane 22. Also, in the lengthwise direction of the case frame 14, it is desirable that the mounting location is generally the lengthwise center of the sidewall 64. This makes it possible to efficiently clean the separation membrane 22 of all the membrane modules 12.

Note that in the present embodiment, the ultrasonic transducer 136 may be constituted by a plate-shaped ultrasonic transducer which is known in the art. In addition, there is no need to utilize a part of the wall of the hermetic case 138 as a front mass member. The sidewall 64 of the sidewall constituent component 62 may be used as a front mass member instead. Moreover, the number of the ultrasonic oscillation unit 134 mounted onto the each sidewall 64 may be plural. Furthermore, it is not necessary for the ultrasonic oscillation unit 134 to be mounted onto the sidewall 64.

In the immersion-type membrane separation apparatus 132 constructed as above, when a high-frequency alternating voltage is applied from the ultrasonic generator 54 to the ultrasonic transducer 136, the ultrasonic transducer 136 generates ultrasonic oscillation. The ultrasonic oscillation is transmitted to the water 18 to be treated via the hermetic case 138 and the sidewall constituent component 62. This will generate cavitation bubbles within the water 18. Then, an impact force created during disappearance of the cavitation bubbles is exerted on the separation membrane 22, so that the separation membrane 22 will be cleaned. Also, the impact force created during disappearance of the cavitation bubbles will induce stirring action. Accordingly, it is also possible to inhibit impurities such as solids from adhering to the separation membrane 22.

While the present invention has been described hereinabove in terms of certain preferred embodiments, these are merely exemplary, and the invention shall not be construed as limited in any way to the specific disclosures in the embodiments.

For example, in the preceding first and second embodiments, the module main body 20 (the water collecting basin 126 in the second embodiment) may be a substitute for the substrate. Specifically, it is also possible to employ the piezoelectric element 34 having drive electrodes formed on its front and back surfaces and secure the piezoelectric element 34 to the electrode formed on the module main body 20 (the water collecting basin 126 in the second embodiment) with sealing material. If the module main body 20 (the water collecting basin 126 in the second embodiment) includes a suitable groove for disposing the lead wires 38, 40, there is no need to form the electrode on the module main body 20 (the water collecting basin 126 in the second embodiment). Additionally, in the preceding first embodiment, it is not necessary to form the housing recess 42 in the module main body 20.

Moreover, in the preceding second embodiment, the ultrasonic transducer 24 may be provided to the other wall of the water collecting basin 126 in the thickness direction (the wall situated in opposition to the wall where the separation membrane 124 is secured). Of course, the ultrasonic transducer 24 may alternatively be provided to another wall if there is a space ensured therefor.

Furthermore, in the preceding second embodiment, the module main body may have a tubular shape. In that case, it is preferable that a flat space for securing the ultrasonic transducer 24 is formed within the module main body.

In addition, in the preceding first and third embodiments, the case frame 14 may be placed on the base wall of the treatment tank 16. In that case, it is necessary to ensure a space for disposing the aerator by arranging the aerator in the case frame 14 or the like.

Besides, it would also be acceptable to employ a mode combining the ultrasonic wave cleaning mechanism described in the preceding first embodiment and the ultrasonic wave cleaning mechanism described in the preceding third embodiment. In that mode, those ultrasonic wave cleaning mechanisms may be operated selectively, or both of them may be operated simultaneously. Note that the combination of the ultrasonic wave cleaning mechanisms may alternatively be a combination of the one described in the preceding second embodiment and the one described in the preceding third embodiment.

It is also to be understood that the present invention may be embodied with various changes, modifications and improvements which may occur to those skilled in the art, without departing from the spirit and scope of the invention.

KEY TO SYMBOLS

10: immersion-type membrane separation apparatus, 12: membrane module, 14: case frame, 16: treatment tank, 18: water to be treated, 20: module main body, 22: separation membrane, 24: ultrasonic transducer, 80: first plate-shape connecting member, 86: bolt, 90: positioning nut, 92: securing nut, 94: clamped rubber element, 96: second plate-shape connecting member, 98: clamped rubber element, 104: fastening nut, 108: aerator, 120: immersion-type membrane separation apparatus, 122: membrane module, 124: separation membrane, 126: water collecting basin

The invention claimed is:

1. An immersion-type membrane separation apparatus comprising:
a treatment tank storing raw water;
a plurality of membrane modules placed within the treatment tank for filtering the raw water stored therein, each membrane module having a module main body and a separation membrane as a filter retained in a given form by the module main body; and
an aerator provided below the membrane modules in the treatment tank, wherein:
a PTFE separation membrane made of a polytetrafluoroethylene porous membrane is employed as the separation membrane of the membrane modules; and
an ultrasonic transducer is provided for cleaning the PTFE separation membrane, wherein
the PTFE separation membrane is a flat membrane,
the module main body has a flat-plate configuration,
the PTFE separation membrane is affixed to the module main body in a stretched state so as to cover at least one of a front surface side and a back surface side of the module main body,
a case frame that supports the plurality of membrane modules is fixed to an interior of the treatment tank,
the plurality of membrane modules are arranged at given intervals in a thickness direction thereof by being supported by the case frame,
the PTFE separation membrane of each membrane module is spread in a vertical direction,
the module main body of each membrane module is provided with a pair of support pieces that project to widthwise opposite sides of the PTFE separation membrane and towards an outside,
the module main body is supported by the case frame at the pair of support pieces,
the case frame is provided with a grasp mechanism for grasping each support piece by exerting grasping force on each of the pair of support pieces in the vertical direction, and a support position adjusting mechanism for adjusting a grasp position of the pair of support pieces by the grasp mechanism with respect to the case frame in the vertical direction,
the grasp mechanism includes a pair of longitudinal connecting members extending in an arranging direction of the plurality of membrane modules while being superposed against the support pieces of the respective membrane modules from vertically opposite sides, and a fastening member for fastening the pair of the connecting members in a direction of getting closer to each other so as to grasp the support pieces of the respective membrane modules between the pair of the connecting members, and
the fastening member includes a bolt passing through the pair of longitudinal connecting members, a positioning nut screwed about the bolt and placed vertically at a lower side of the pair of the longitudinal connecting members, and a fastening nut screwed about the bolt and placed vertically at an upper side of the pair of the longitudinal connecting members, and the support position adjusting mechanism includes the bolt and the positioning nut.

2. The immersion-type membrane separation apparatus according to claim 1, wherein the ultrasonic transducer is attached to the module main body so that an ultrasonic oscillation generated in the ultrasonic transducer is exerted on the PTFE separation membrane from the module main body.

3. The immersion-type membrane separation apparatus according to claim 1, wherein the ultrasonic transducer emits an ultrasonic wave so as to generate cavitation bubbles within the raw water, and an impact force created during disappearance of the cavitation bubbles is exerted on the PTFE separation membrane.

4. The immersion-type membrane separation apparatus according to claim 1, wherein the PTFE separation membrane is made by coating a base membrane made of polyethylene terephthalate with polytetrafluoroethylene and has a thickness dimension of 0.1 to 0.3 mm.

5. The immersion-type membrane separation apparatus according to claim 1, wherein the PTFE separation membrane is a hollow fiber membrane, and at least two ends of the hollow fiber membrane is supported by the module main body.

6. The immersion-type membrane separation apparatus according to claim 1, wherein the ultrasonic transducer is superposed against and attached to an outside surface of the case frame.

7. The immersion-type membrane separation apparatus according to claim 1, wherein the case frame is provided at a base part thereof with a bottom surface support portion for supporting a lower end of the module main body in a state of contact from vertically below.

8. The immersion-type membrane separation apparatus according to claim 1, wherein an ultrasonic oscillation absorbing member is interposed at a site of grasp of the pair of support pieces by the grasp mechanism of the case frame.

* * * * *